US005934869A

United States Patent [19]

Janisse

[11] Patent Number: 5,934,869

[45] Date of Patent: Aug. 10, 1999

[54] FAN CLEANING SYSTEM AND EASILY CLEANED FAN

[75] Inventor: Mark T. Janisse, St. Clair Beach, Canada

[73] Assignee: Dwight C. Janisse & Associates, Troy, Mich.

[21] Appl. No.: 08/796,935

[22] Filed: Feb. 7, 1997

Related U.S. Application Data

[60] Provisional application No. 60/011,254, Feb. 7, 1996, and provisional application No. 60/011,283, Feb. 7, 1996.

[51] Int. Cl.[6] .................................................... F03D 9/00

[52] U.S. Cl. ........................ 415/121.3; 134/183; 134/200

[58] Field of Search ......................... 415/121.3; 134/182, 134/183, 179, 200

[56] References Cited

U.S. PATENT DOCUMENTS

| | | | |
|---|---|---|---|
| 2,936,770 | 5/1960 | Emanual | 134/179 |
| 5,158,429 | 10/1992 | Chiang et al. | 415/121.3 |
| 5,273,395 | 12/1993 | McDermott | 415/121.3 |
| 5,323,762 | 6/1994 | Chiang et al. | 415/121.3 |
| 5,630,435 | 5/1997 | Brouchoud et al. | 134/200 |

FOREIGN PATENT DOCUMENTS

| | | | |
|---|---|---|---|
| 1240480 | 6/1986 | U.S.S.R. | 134/200 |
| 1463353 | 3/1989 | U.S.S.R. | 134/200 |

*Primary Examiner*—John Kwon
*Attorney, Agent, or Firm*—Howard & Howard

[57] ABSTRACT

A fan cleaning system includes a fan having a motor mounted to a support structure. A fan blade is mounted to a shaft of the motor and enclosed by a fan guard. In one aspect of the invention, the fan guard comprises a front guard and a rear guard having an upper rear guard and a lower rear guard. The upper rear guard and lower rear guard are mounted to the motor on opposite sides of the motor and shaft thereby permitting removal of the upper and lower rear guards from the motor without removing the fan blade. In a second aspect of the invention, fan cleaning system includes a cleaning shroud which completely encloses the fan guard, blade and part of the motor. The cleaning shroud preferably comprises an upper shroud and a lower shroud and an upper shroud bracket and a lower shroud bracket sealingly mounted against the motor. A J-shaped spray arm is rotatably mounted about an axis generally aligned with the axis of the motor and includes a plurality of spray heads which spray the fan guard and blade from the front and rear. The spray heads are mounted at an angle to create a propulsive force which causes the J-shaped spray arm to rotate on its axis. The cleaning shroud can be secured to the fan, mounted in place without removing the fan guard, fan blade or removing the motor from its mounting.

10 Claims, 4 Drawing Sheets

FAN CLEANING SYSTEM AND EASILY CLEANED FAN

This application claims priority to U.S. Provisional Applications Ser. Nos. 60/011,254 and 60/011,283, both filed on Feb. 7, 1996.

BACKGROUND OF THE INVENTION

The present invention relates generally to a fan system and more particularly to a fan system which allows for cleaning without the need for removal of the blade from the motor shaft or motor from its mount.

Air circulators, or fans, are used to cool people in small to large industrial plants. If the plant is not air conditioned, health becomes an issue on hot and humid days when employees are not cooled using air circulating fans. Air circulators are spread throughout the facility to the point where there might easily be 2,000 to 3,000 or more fans in a large facility.

Guards and blades of these fans rapidly become dirty in an industrial plant. Dirty guards and blades cause the fans to lose efficiency, i.e. blow less air. Eventually the motor overloads possibly causing early motor burn-out. Further, when plant personnel see the dirt on the fan guard and blade, they sense that the fan is blowing "dirty air" towards them. Thus, the fans are cleaned frequently.

It has been an extremely costly problem for the large industrial plants to clean thousands of fans a minimum of once a year. Often one department within an automotive or other large industrial plant could spend in excess of $100,000 per year cleaning their air circulators. Fan cleaning has thus developed into an extremely expensive maintenance "nightmare."

Present practice is for maintenance personnel to perform either one of two cleaning procedures. In one procedure, the maintenance personnel remove the fan head assembly (guard, blade, and motor) from the mount. Many of the fans are mounted high in the ceiling or structural steelwork and thus this procedure is somewhat difficult. The head assembly is moved to the plant wash area where the head assembly is cleaned manually with a conventional high pressure steam/hot water/soap spray. After air drying, the cleaned head assembly is reinstalled on the mount. Typically, the reinstalled fan must be re-aimed 2 or 3 times to get it "just right." This process must be repeated for each fan. As stated above, a facility can include thousands of fans.

In another known procedure, maintenance personnel remove the front guard, blade, and rear guard individually, which are the dirty parts of this fan, but leave the motor attached to mount. These 3 pieces are then moved to the spray area and manually cleaned with conventional high pressure steam/hot water/soap spray. After parts are dry they are then moved back to their motors (which were left on their mounts) and reinstalled. Because the fan blade is removed from the guard using this method, it is subject to damage as is it being cleaned. Also, the blade frequently is "frozen" on to the shaft causing one to use a prop puller to assist in removing the blade. Further, either practice is very time consuming and extremely expensive, and usually performed as a 2 person operation.

The assignee of the present invention first addressed the cleaning problem with its quick assembly, hinged safety guard, with quick mounting ring. This allowed for much quicker and easier removal of the 3 dirtiest parts of the fan for individual, conventional cleaning: the front guard, the blade, and the rear guard. However, the blade still has to be removed to remove and clean the rear guard.

SUMMARY OF THE INVENTION

The present invention provides a fan system including a fan and fan cleaning system in which the fan guard and fan blade can be cleaned without removing the fan blade from the motor shaft or removing the motor from its mount. The inventive cleaning system and guard are disclosed as used together. However, the two inventions are useable separately.

The fan generally includes a motor mounted on a support arm from a ceiling or wall, or on a stand. The motor drives a shaft connected to a fan blade, which is enclosed by a fan guard. To permit removal of the fan guard without removing the fan blade from the shaft or removing the motor from the support arm, the fan guard preferably comprises a rear guard comprising an upper rear guard and a lower rear guard. The two halves are secured to the motor through bolts. A front guard is mounted to the rear guard in front of the fan blade. Although the two part rear guard embodiment is disclosed as upper and lower halves, certainly other orientations such as side-to-side are within the scope of the invention. Although the drawings illustrate two half portions, other arrangements wherein one guard covers more than half and the other covers less are also covered by this aspect of the invention.

Preferably, pairs of eyelets on the front guard generally align with pairs of eyelets of the rear guard. The front guard is preferably secured to the rear guard utilizing a curved rod with an integrated locking pin. Alternatively, the front guard could be bolted, hooked or otherwise secured to the rear guard halves.

The fan cleaning system generally comprises a cleaning shroud large enough to enclose the fan guard and part of the motor. The cleaning shroud preferably comprises an upper shroud, a lower shroud, an upper shroud bracket, and a lower shroud bracket. Each of the upper shroud and lower shroud, together with the upper shroud bracket and lower shroud bracket respectively, comprise half shells. Mounted together, the shells completely enclose the fan guard and blade and form a waterproof seal against the motor housing.

A revolving spray arm is preferably J-shaped and rotatably secured to the inside of one shroud at a point generally coinciding with the shaft of the motor. A portion of the J-shaped spray arm extends behind the fan guard. The spray arm includes a plurality of spray heads aiming inwardly at the fan guard and fan blade. Propulsion force created by mounting the spray heads at an angle causes the spray arm to revolve around the entire circumference of the fan guard.

Steam, hot water, soap and/other cleansers or solvents are supplied to the spray arm by a supply line. Waste water is removed from the cleaning shroud via a drain in the bottom of the lower shroud. A pump unit removes water from the drain via a return line. The pump unit includes a filter leading to a recycling unit and return to the clean water reservoir where detergent is added. The water is then heated by a heat source and returned to the spray arm by the supply line.

The fan blade and guard can be cleaned without removing the fan blade from the shaft or the motor from its mount. The front guard is removed from the rear guard by removing the rods and locking pins. Once the front guard has been removed from the rear guard, the lower guard and upper guard are removed from the motor. Because the upper guard and lower guard are mounted on opposite sides of the shaft and motor, the two halves can be removed without removing the fan blade from the shaft. The motor and fan blade are left mounted in position without disturbing the position of the motor and fan blade. The front guard and rear guard are moved to a cleaning area for cleaning. The fan blade is easily wiped clean in position on the motor shaft without risk of damaging the fan blade. After drying, the front guard and rear guard are reinstalled on the motor in position. Therefore, there is no need to reposition or aim the fan after cleaning. Further, the removal and cleaning of the relatively light front guard and rear guard can be performed by one person, because the heavy motor and fan blade remain mounted in position.

For periodic cleaning, the fan cleaning system cleans the fan guard and fan blade in place, without removing the fan guard or fan blade or removing the motor from the mount. First the upper shroud bracket is placed against the motor with the seal against the top of the motor. Then the lower shroud bracket is secured to the upper shroud bracket, sealing against the underside of the motor. The upper shroud is then placed over the upper half of the fan guard slidably engaging the upper shroud bracket. The lower shroud is then placed over the lower half of the fan guard, slidably engaging the lower shroud bracket and connecting to the upper shroud. The fan guard and blade are completely enclosed by the shroud which is tightly sealed against the motor housing. When the pump unit is turned on, the spray heads spray water and/or cleaning solution onto the fan guard and fan blade. The spray heads propel the spray arm rotatably about the fan guard and fan blade for thorough cleaning. Waste water flows to the drain in the bottom of the lower shroud and through the return line where it is filtered, recycled and heated in the pump unit before being returned via the supply line to the spray arm. After cleaning, the lower shroud and upper shroud are removed from the fan. Because the fan guard, blade and motor have not been removed from the mounting bracket, the fan need not be repositioned or reaimed. Further, because the fan guard, blade and motor were not disassembled, the likelihood of damage to the fan blade is substantially reduced, as is the time and man power required for cleaning.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF A PREFERRED EMBODIMENT

Figure 1:
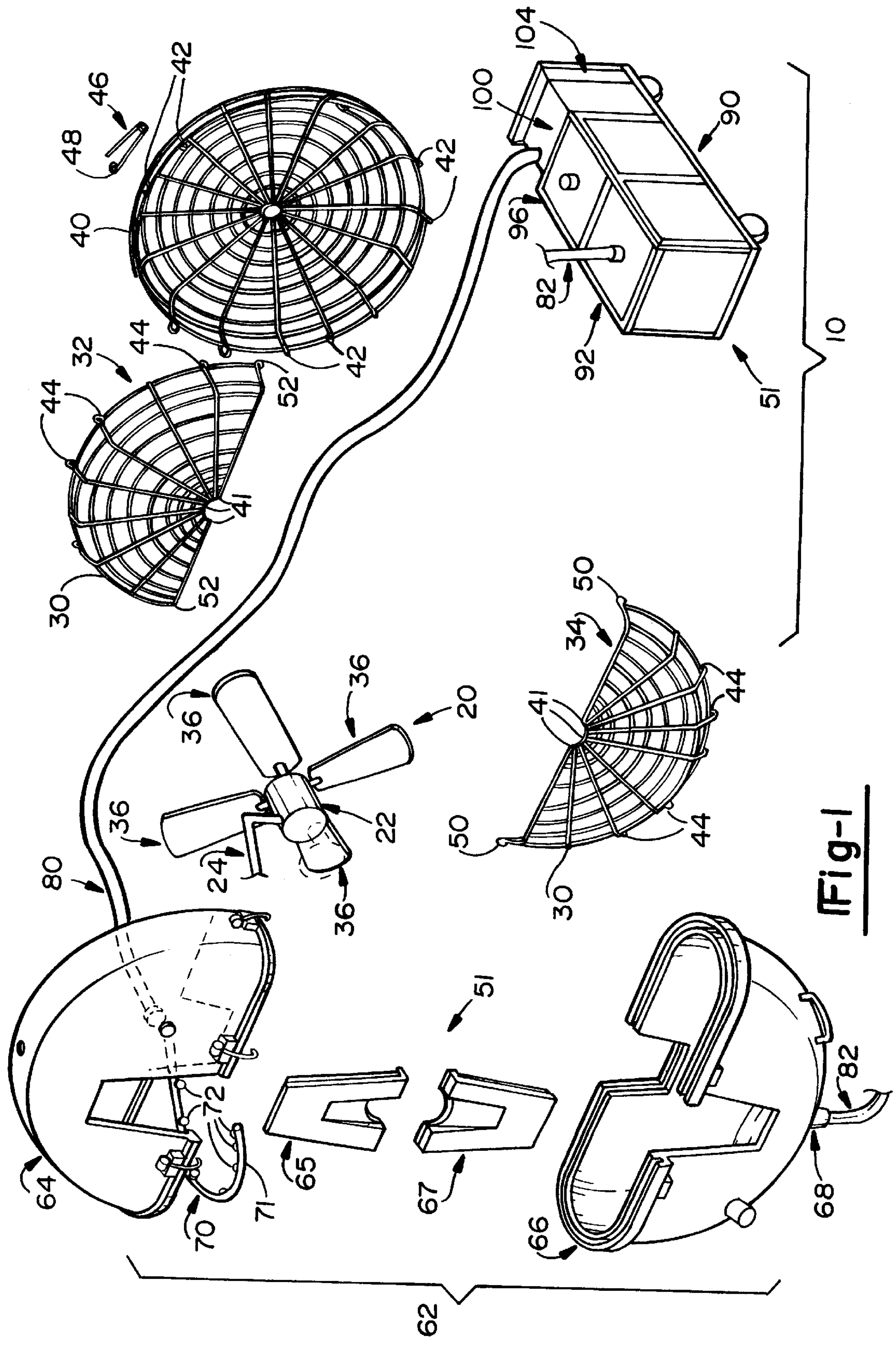
FIG. 1 is a exploded view of the fan system of the present invention.

The fan system 10, of the present invention is shown generally in FIG. 1 and includes fan 20 having a motor 22 driving a shaft (not shown) and mounted to a bracket 24. The fan 20 further includes a rear guard 30 comprising an upper guard 32 and a lower guard 34. A fan blade 36 is mounted on the shaft between the rear guard 30 and a front guard 40. The upper guard 32 and lower guard 34 each include a plurality of key-shaped holes 41 for mounting to the front of the motor 22 with bolts. The front guard 40 and rear guard 32 are preferably each a generally circular half-shell of a diameter larger than that of the blade 36. Preferably, although not necessarily, the upper and lower guards 32, 34 each comprise semi-circular halves of the rear guard 30.

Preferably, pairs of eyelets 42 on the front guard 40 generally align with pairs of eyelets 44 on the rear guard 30. The front guard 40 is secured to the rear guard 30 utilizing a rod 46 with an integrated locking pin 48 such as disclosed in U.S. Pat. No. 5,002,462. Alternatively, the front guard 40 could be bolted, hooked, or otherwise secured to the upper guard 32 and lower guard 34.

Each of two end eyelets 50 on the lower guard 34 is coupled with an end eyelet 52 on the upper guard 32 and an eyelet 44 on the front guard 40 when the rear guard 30 is secured to the front guard 40. It should be apparent that the upper guard 32 and lower guard 34 could also be secured to the front guard 40 utilizing bolts, hinges, hooks or other known methods for securing the rear guard 30 to the front guard 40.

A fan cleaning system 51 according to the present invention includes a cleaning shroud 62 having an upper shroud 64, upper shroud bracket 65, a lower shroud 66, and a lower shroud bracket 67. As shown, upper shroud 64 may include a steam relief opening 65. The shroud 62 is large enough to enclose the fan guards 30, 40 and part of the fan motor 22. The shroud 62 is formed of a lightweight, durable material, and preferably a carbon fiber composite material. A fluid drain 68 is preferably located at the bottom of the lower shroud 66.

The fan cleaning system 51 further includes a revolving spray arm 70. The spray arm 70 is generally J-shaped and includes a portion 71 extending behind one of the fan guards. The spray arm 70 is rotatably secured to the inside of the upper shroud 64 at a point that will generally coincide with the shaft 108 of the motor 22 when mounted on the fan. The spray arm 70 includes a plurality of spray heads 72 aiming inwardly, which are also formed on the portion 71. A structure for the spray arm 70 is generally known in the fluid cleaning art and preferably rotates by propulsion force created by mounting the spray heads 72 at an angle. In some applications, the spray heads could be stationary within the cleaning shroud 62.

The shroud halves 64 and 66 are shown with the spray arm mounted on the upper shroud 64. However, the spray arm may also be mounted on the lower shroud half 66. Moreover, although the brackets, etc. are shown, they can be eliminated such that the shrouds are attached directly to the motor. Finally, although the brackets are shown having a generally polygonal outer periphery, it may be preferable that the shape of the brackets be curved to facilitate sealing.

Steam, hot water, soap, and/or other cleansers are supplied to the spray arm 70 by a supply line 80. Waste water is removed from the cleaning shroud 62 via the drain 68 connected to a return line 82 leading to a pump unit 90. The pump unit 90 is shown schematically and may include known components. Preferably a filter 92 leads to a recycling unit 96 and is returned to the clean water reservoir 100 where detergent is added. The water is then heated by a heat source 104, preferably electric or gas, and returned to the spray arm 70 by the supply line 80.

Figure 2:
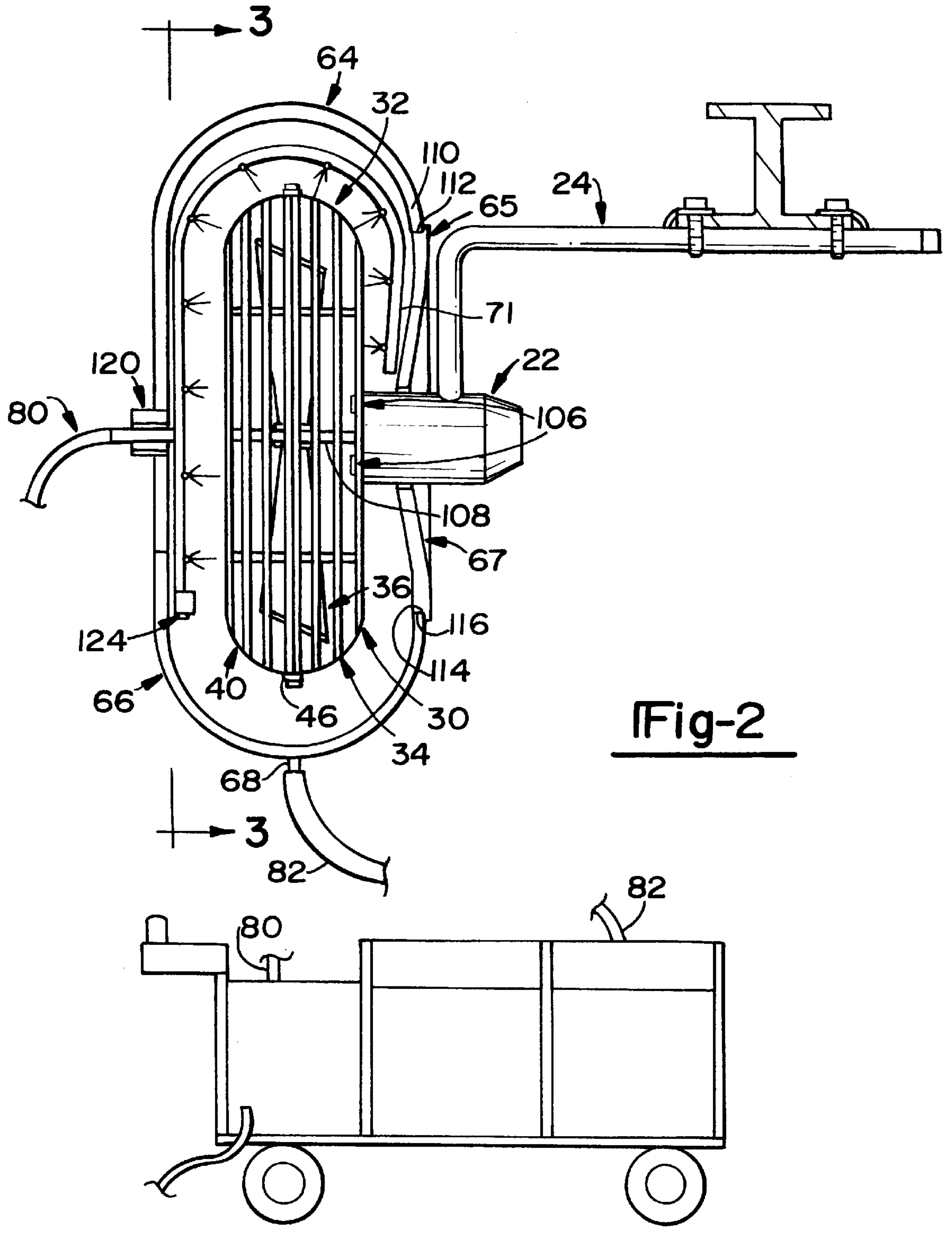
FIG. 2 is an assembled view, partially broken away of the fan system of FIG. 1.

As can be seen in FIG. 2, the motor 22 is mounted by the bracket 24 to a ceiling, wall or a stand. The mounting structure can take various configurations, as is known in the art. The upper guard 32 and lower guard 34 are each mounted to the front of the motor 22 with a plurality of bolts 106 inserted through the key-shaped holes. The fan blade 36 is mounted to the shaft 108 of the motor 22. The front guard 40 is mounted to the rear guard 30 utilizing the rods 46. The upper shroud bracket 65 and lower shroud bracket 67 are mounted on opposite sides of the motor 22 and shaft 108, and form a water-tight seal against the housing of the motor 22. A tongue 110 on the upper shroud 64 slides into a groove 112 on the upper shroud bracket 65. Likewise, a tongue 114 on the lower shroud 66 slidably engages a groove 116 on the lower shroud bracket 67 connection, thereby forming a water tight seal.

The spray arm 70 is rotatably connected to the upper shroud 64 at a point generally coinciding with the shaft 108 of the motor 22. The spray arm 70 is connected to the upper shroud 64 with a waterproof bearing 120, preferably part number 1005 available from CE Sales of Troy, Mich. The supply line 80 is connected to the waterproof bearing 120 by a quick connect connectors, preferably part numbers 1004 and 1006 from CE Sales. The spray arm 70 includes a portion 71 spraying the rear fan guard 30 and the fan blade 36 from the rear. The spray arm 70 further includes a counterweight 124 on an end opposite the portion 71. The drain 68 preferably connects to the return line 82 via quick release fittings, preferably part numbers 1005, 1006 available from CE Sales. Preferably, the spray arm 70 and portion 71 are sized such that it will be large enough to rotate about several sizes of fans.

Figure 3:
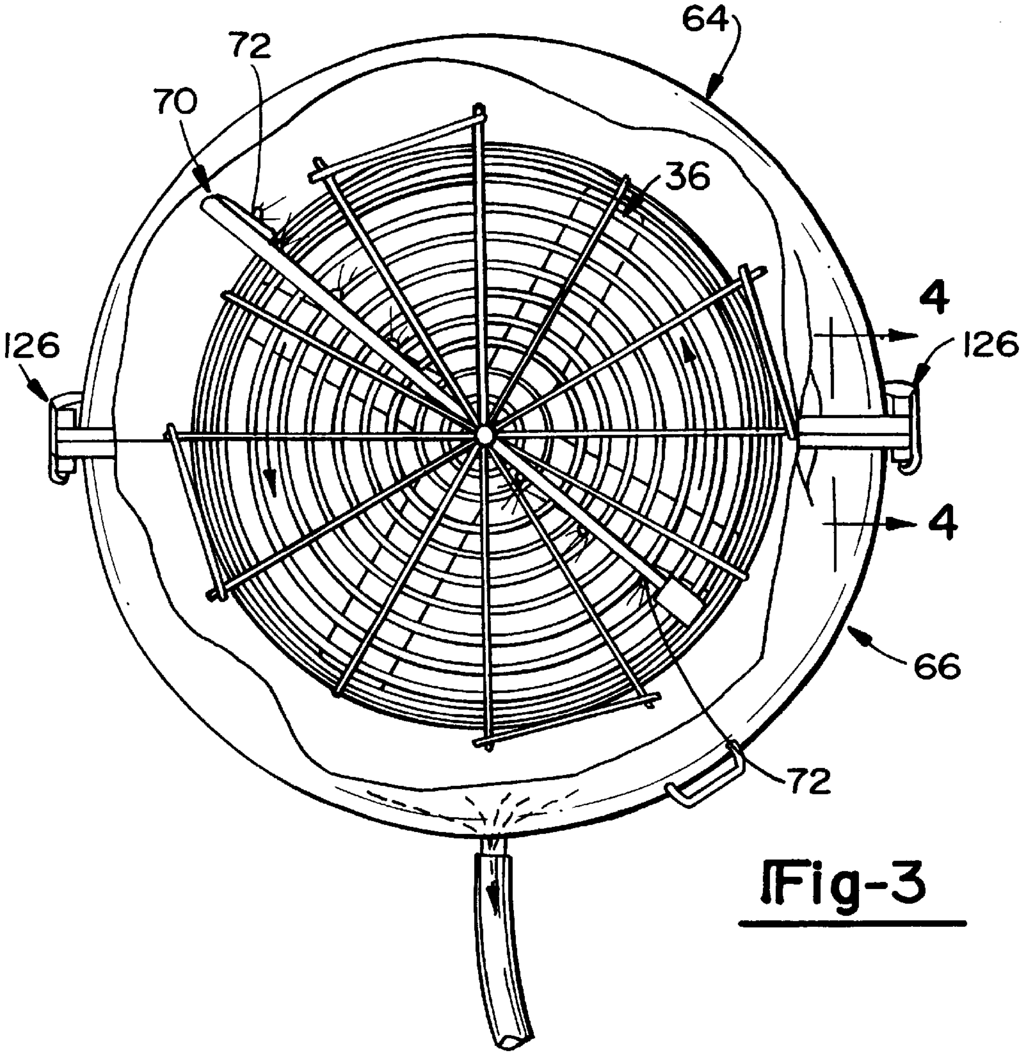
FIG. 3 is a view taken along line 3—3 of FIG. 2.

Referring to FIG. 3, the upper shroud 64 is secured to the lower shroud 66 with a plurality of clamps 126, such as part numbers 1002, available from CE Sales. As can be noted in FIG. 3, the spray heads 72 are mounted at angles on the spray arm 70 in order to provide a propulsion force causing rotation of the spray arm 70 generally about the axis of the motor 22.

Figure 4:
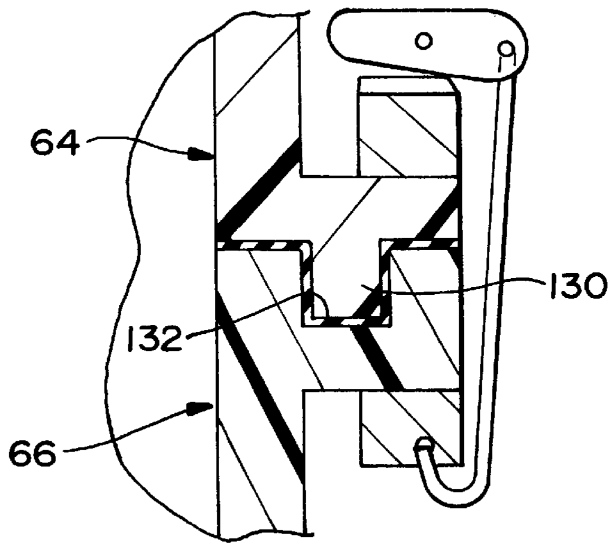
FIG. 4 is an enlarged sectional view taken along line 4—4 of FIG. 3.

As can be seen in FIG. 4, the upper shroud 64 preferably includes a tongue 130 forming a water tight seal with a groove 132 and the lower shroud 66. The clamps 126 removably secure the upper shroud 64 to the lower shroud 66. It should be recognized that other fasteners could also be utilized, such as bolts or hooks.

Figure 5A:
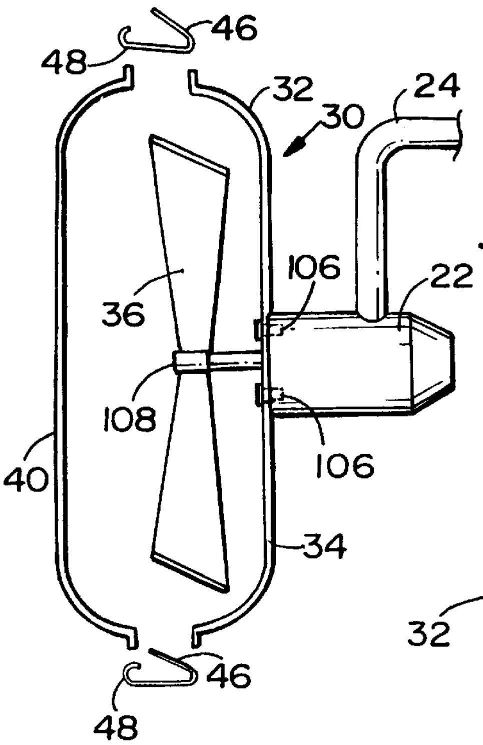
FIG. 5A schematically shows a first step in cleaning the inventive fan guard.
Figure 5B:
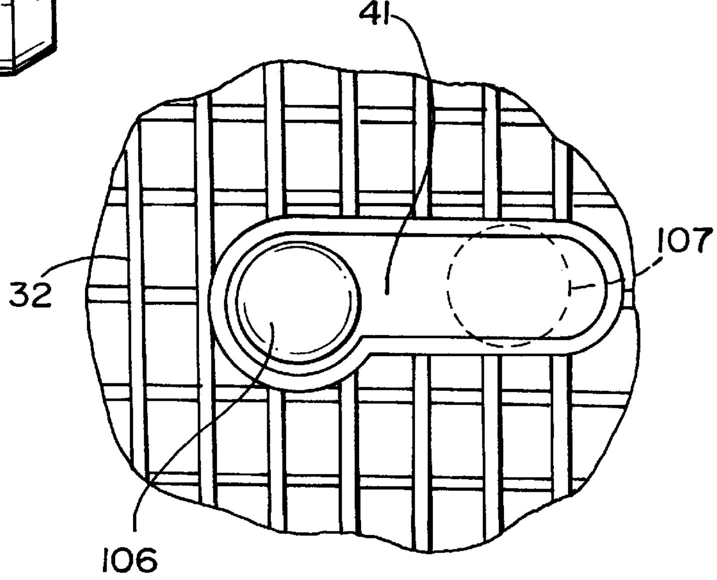
FIG. 5B schematically shows a step subsequent to the FIG. 5A step.

In one method of cleaning, the motor 22 is mounted by the bracket 24 from a ceiling, a wall, or on a stand as shown in FIG. 5A. For cleaning, the front guard 40 may be removed from the rear guard 30 by removing the rods 46 and locking pins 48. As is shown in FIG. 5B, once the front guard 40 has been removed from the rear guard 30, the lower guard 34 and upper guard 32 are removed from the motor 22 by loosening the bolts 106, without removing the fan blade 36 from the shaft 108; that is, the two halves 34, 32 can be turned to allow bolts 106 to move from a locked position 107, shown in phantom where they are aligned with a thin portion of hole 41 to the illustrated position where bolts 106 are aligned with a larger portion of hole 41. Holes 41 can then pass over bolts 106 when guard halves 32 and 34 are moved forwardly away from the motor front face plate.

Figure 5C:
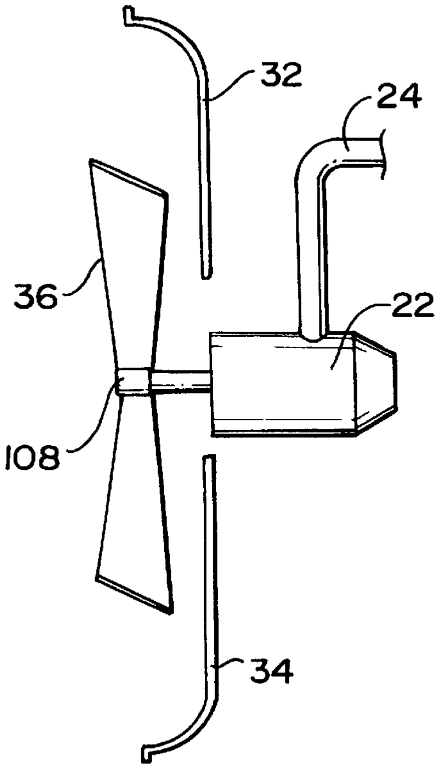
FIG. 5C schematically shows a step subsequent to the FIG. 5B step.

The guard halves 32 and 34 may then be removed radially outwardly from the motor 22 and mounting shaft, as shown in FIG. 5C. The motor 22 and fan blade 36 are left mounted in position without disturbing the position of the motor 22 and fan blade 36. The front guard 40 and rear guard 30 are moved to a cleaning area for either conventional cleaning or by ultrasonic cleaning methods. The fan blade 36 is easily wiped clean in position on the motor shaft without risk of damaging the fan blade 36 due to handling. After drying, the front guard 40 and rear guard 30 are reinstalled onto the motor 22 in position. Therefore, there is no need to re-position or aim the fan after cleaning. Further, the removal of the front guard 40 and rear guard 30 as well as the cleaning can be performed by one person because the heavy motor 22 and fan blade 36 remain mounted in position.

Alternatively the fan cleaning system can be used to clean the fan guards 30, 40 and fan blade 36 in place without removal. It should be understood the cleaning system can also be used to clean standard fans, without the two part rear guard. One person can install the cleaning shroud 62 over the fan guards 30, 40. First, the upper shroud bracket 65 and lower shroud bracket 67 are mounted on the motor 22. Then, the upper shroud 64 is secured to the upper shroud bracket 65 and the lower shroud 66 is slid onto the lower shroud bracket 67 and secured to the upper shroud 64, completely enclosing the fan guards 30, 40 and fan blade 36. When the pump unit 90 is turned on, the spray heads 72 spray water and/or cleaning solution on the fan guards 30, 40 and fan blade 36. The spray heads 72 propel the spray arm 70 rotatably about the fan guards 30, 40 and fan blade 36 for thorough cleaning. The cleaning system includes a switch that activates cleaning and operates a specific operating cycle time, for example, five minutes. Waste water flows to the drain 68 in the bottom of the lower shroud 66 through the return line 82 where it is filtered, recycled and heated in the pump unit 90 before being returned via the supply line 80 to the spray arm 70. After cleaning, the lower shroud 66 and upper shroud 64 are removed from the fan 20. Because the fan guards 30, 40 and fan blade 36 and fan motor 22 have not been removed from the mounting bracket, the fan 20 need not be repositioned or re-aimed. Further, because the fan guards 30, 40, fan blade 36 and motor 22 were not disassembled, the likelihood of damage to the fan blade 36 is substantially reduced, as is the time required for cleaning.

In accordance with the provisions of the patent statutes, the present invention has been described in what is considered to represent its preferred embodiment. However, it should be noted that the invention can be practiced otherwise than as specifically illustrated and described without departing from its spirit.

What is claimed is:

1. A fan cleaning system for cleaning a fan having a guard enclosing a fan blade driven by a motor, said fan cleaning system comprising:

a shroud for enclosing the guard and the blade, the motor of the fan being mounted to the blade, but outside of said shroud;

at least one spray head within said shroud for cleaning the guard and the blade.

2. The fan cleaning system of claim 1 further including:

a spray arm revolving generally about an axis of the motor of the fan, said at least one spray head mounted on said spray arm.

3. The fan cleaning system of claim 2 wherein said spray arm is generally J-shaped.

4. The fan cleaning system of claim 2 wherein said spray arm includes a plurality of spray heads, said spray heads spraying the guard and fan blade from two opposite sides.

5. The fan cleaning system of claim 2 wherein said at least one spray head generates a propulsive force causing said spray arm to revolve about the fan blade.

6. The fan cleaning system of claim 2 wherein the motor extends rearwardly from the guard of the fan, said shroud comprising an upper shroud and a lower shroud, said upper and lower shrouds mounted on the motor.

7. The fan cleaning system of claim 6 wherein said upper and lower shrouds seal against the motor.

8. The fan cleaning system of claim 6 wherein said upper and lower shrouds seal further include upper and lower shroud brackets, respectively, said upper and lower shroud brackets mounted on opposite sides of the motor and shaft.

9. A method for cleaning a fan including the steps of:

(1) providing a blade and guard mounted on a motor;

(2) mounting a cleaning structure around said blade, with said motor being outside of said cleaning structure;

(3) cleaning said blade and said guard with said fan blade mounted on said motor.

10. A method as recited in claim 9, wherein one of said blade and said cleaning structure is rotated relative to the other during the cleaning of step (3).

* * * * *